United States Patent [19]

Iwatsuki et al.

[11] Patent Number: 4,862,768

[45] Date of Patent: * Sep. 5, 1989

[54] LIMITING/SWITCHING DEVICE FOR FOUR WHEEL DRIVE VEHICLE

[75] Inventors: Tatsuya Iwatsuki, Okazaki; Mutsumi Kawamoto, Tokyo; Takenori Kano, Anjo, all of Japan

[73] Assignee: Aisin-Warner Kabushiki Kaisha, Anjo, Japan

[ * ] Notice: The portion of the term of this patent subsequent to May 24, 2005 has been disclaimed.

[21] Appl. No.: 948,216

[22] Filed: Dec. 31, 1986

[51] Int. Cl.$^4$ ............................................. F16H 37/08
[52] U.S. Cl. .................................. 74/701; 192/85 AA; 180/249; 74/710.5
[58] Field of Search ............... 74/710.5, 711, 665 GA, 74/665 T, 674, 679, 701, 405; 180/247, 248, 249, 250; 192/85 AA

[56] References Cited

U.S. PATENT DOCUMENTS

| | | | |
|---|---|---|---|
| 3,650,364 | 3/1972 | Laing | 192/85 AA |
| 3,690,429 | 9/1972 | Honda | 192/85 AA |
| 3,877,321 | 4/1975 | Storer, Jr. | 192/85 AA X |
| 4,476,952 | 10/1984 | Suzuki | 74/701 X |
| 4,582,160 | 4/1986 | Weismann et al. | 180/250 |
| 4,601,359 | 7/1986 | Weismann et al. | 180/248 X |
| 4,643,045 | 2/1987 | Katayama | 74/701 X |
| 4,645,029 | 2/1987 | Sasaki et al. | 74/701 X |
| 4,669,332 | 6/1987 | Katayama | 74/701 |
| 4,671,135 | 6/1987 | Dangel | 74/701 X |

FOREIGN PATENT DOCUMENTS 0132238  1/1985  European Pat. Off. ............ 180/249

Primary Examiner—Dirk Wright
Attorney, Agent, or Firm—Frank J. Jordan; C. Bruce Hamburg; Manabu Kanesaka

[57] ABSTRACT

Provided is a power transmission device for four-wheel drive vehicles of both the full-time type and part-time types, wherein a wet multiple-disc clutch is mounted in a ring gear covering the front-wheel differential gear and arranged coaxially with the differential gear. The wet multiple-disc type clutch is engaged by means of a hydraulic actuator in which a plurality of pistons are arranged in series. Hydraulic pressure is fed into oil chambers formed by the pistons through individual or common oil passages. The wet multiple-clutch constitutes a differential motion limiting device for stopping or limiting the differential motion of a center differential gear for the full-time four wheel drive, or constitutes a rear wheel drive switching unit for engaging and disengaging the power transmission between the ring gear mount casing and the transfer unit.

11 Claims, 4 Drawing Sheets

LIMITING/SWITCHING DEVICE FOR FOUR WHEEL DRIVE VEHICLE

FIELD OF THE INVENTION

The present invention relates to a power transmission device for four-wheel drive vehicles, and particularly to a power transmission device for four-wheel drive vehicles based F. F (front engine - front wheel drive) vehicles. Further, the present invention is applicable to both full-time four-wheel drive power transmission devices, which transmit rotation to both front and rear wheels at all times, and part-time four-wheel drive power transmission devices, which transmit rotation normally to the front (or rear) wheels alone while providing four-wheel drive when required.

DESCRIPTION OF THE RELATED ART

Heretofore, there have been proposed various kinds of power transmission devices for four-wheel drive vehicles, which are obtained by slightly modifying the power transmission devices for transverse front engine - front wheel drive vehicles.

Generally, a center differential gear is indispensable for a full-time four-wheel drive vehicle in order to prevent the vehicle from experiencing the phenomenon commonly known as "tight cornering brake", that is a braking condition due to the difference in rotational speeds between the front wheels and rear wheels when the vehicle makes a tight turn at low rate speed on a road surface having a high friction coefficient. It is also necessary to provide a differential motion limiting mechanism for stopping or limiting the operation of the center differential gear since the provision of the center differential gear lead to a condition in which no torque can be transmitted due to the operation of the differential gear when the load to either one of the wheels of the four-wheel drive vehicle is lost. The differential motion limiting mechanism generally comprises a sleeve for engaging and disengaging the right hand side gear with a pinion shaft, this sleeve being slidably supported on the shaft section of the side gear through splines so that the front end of the sleeve engages with, and disengages from, the pinion shaft in a dog-clutch manner to switch the operation of the center differential gear.

In a part-time type four-wheel drive vehicle, a friction clutch is provided in the transfer section for transmitting power to the rear wheels in order to switch the power on and off, that is, the clutch switches the vehicle operation from the front-wheel drive mode to the four-wheel drive mode, and vice versa.

BACKGROUND OF THE INVENTION

With a mechanical clutch such as a dog clutch, as used in the above-mentioned differential motion limiting mechanism it is difficult to engage when a large difference in rotation exists between the front and rear wheels, and it is difficult to disengage the dog-clutch when a large surface pressure, due to torque, acts upon the engaged tooth surfaces of the clutch. Therefore, this type of mechanical clutch cannot be freely and instantly actuated, presenting difficulty in the control of the power transmission device.

The above-mentioned difficulty in control can be eliminated if a friction clutch is used as in a part-time four wheel drive vehicle, for switching between the two-wheel drive mode and the four-wheel drive mode, but it is difficult to accommodate a clutch with the required torque transmitting capacity in a confined space, resulting in shortage of torque transmitting capacity, particularly in the case where the clutch is mounted in the transmission downstream of the final speed reduction gear. It may be conceived to actuate the friction clutch by means of a mechanical power boost mechanism such as a cam. However, in such a case, it is difficult to finely control the engaging force, and therefore difficult to control clutch slippage with high degree of accuracy, hence, it cannot properly perform the four-wheel drive control according to road conditions.

Accordingly, an object of the present invention is to provide a power transmission device which solves the abovementioned problems with a compact structure and a sufficient torque transmitting capacity while employing a friction clutch, and which can apply engaging force to the friction clutch with high degree of accuracy.

SUMMARY OF THE INVENTION

The present invention is devised in view of the above-mentioned circumstances, and accordingly provides a power transmission device for a four-wheel drive vehicle, comprising an automatic transmission, a front-wheel differential gear and a transfer section, wherein a friction clutch (wet multiple-disc type) is disposed in a casing (ring gear mount casing) which covers the front wheel differential gear and which is a transmitting member arranged coaxially with the differential gear. The friction clutch is engaged by a hydraulic actuator composed of a plurality of pistons disposed in series.

It is noted that the above-mentioned arrangement is applicable to a power transmission device for a full-time four-wheel drive vehicle having a center differential gear, in which case, the friction clutch constitutes a differential-motion limiting device for stopping or limiting the differential operation of the center differential gear. The above-mentioned arrangement is also applicable to a power transmission device for a part-time four-wheel drive vehicle composed of a power transmitting device in which a transfer section transmits a power directly to the rear wheel side, in which case the friction clutch constitutes a rear-wheel drive switching unit for switching the power transmission between the ring gear mount casing and the transfer section.

DETAILED DESCRIPTION OF THE PREFERRED EMBODIMENT

The present invention shall now be explained in one embodiment form with reference to the drawings.

Figure 2:
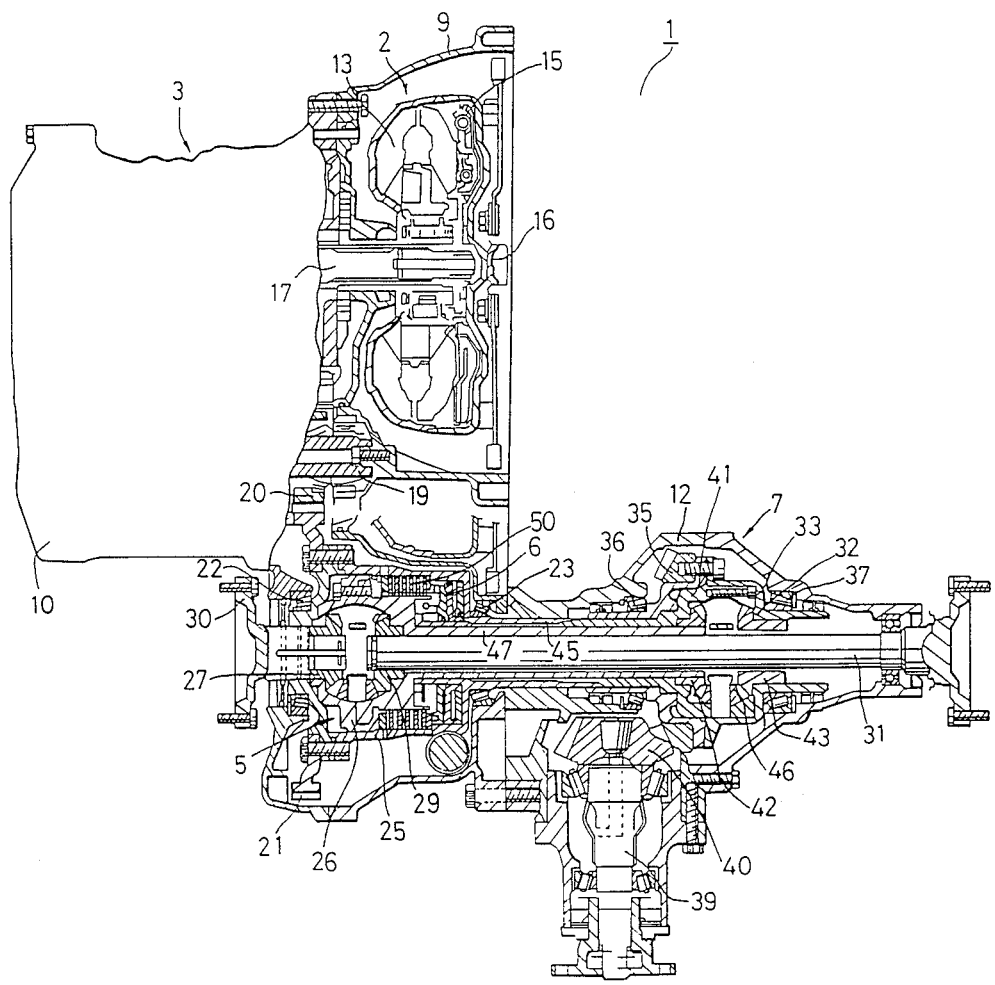
FIG. 2 is a cross-sectional view illustrating a power transmission device for a full-time four-wheel drive vehicle to which the present invention is applied.

A power transmission device 1 for a transverse front-engine full-time four-wheel drive vehicle, is provided, as shown in FIG. 2, with a torque converter unit 2, an automatic transmission 3, a front-wheel differential gear 5, a differential motion limiting mechanism 6 and a transfer unit 7, these being disposed in. A trans-axle housing 9, a trans-axle casing 10 and a transfer casing 12 are jointed to each other. The torque converter section 2 comprises a torque converter 13 and a lock-up clutch 15, the rotation of this engine output shaft 16 being transmitted through them to an input shaft 17. The automatic transmission 3 is composed of a three-stage planetary gear unit which is controlled by clutch and brake, the rotation of the input shaft 17 being subjected to suitable speed reduction of any of the first, second, third, over-drive and reverse gear stages and being transmitted to an output gear 20 rotatably supported on a shaft 19.

Figure 3:
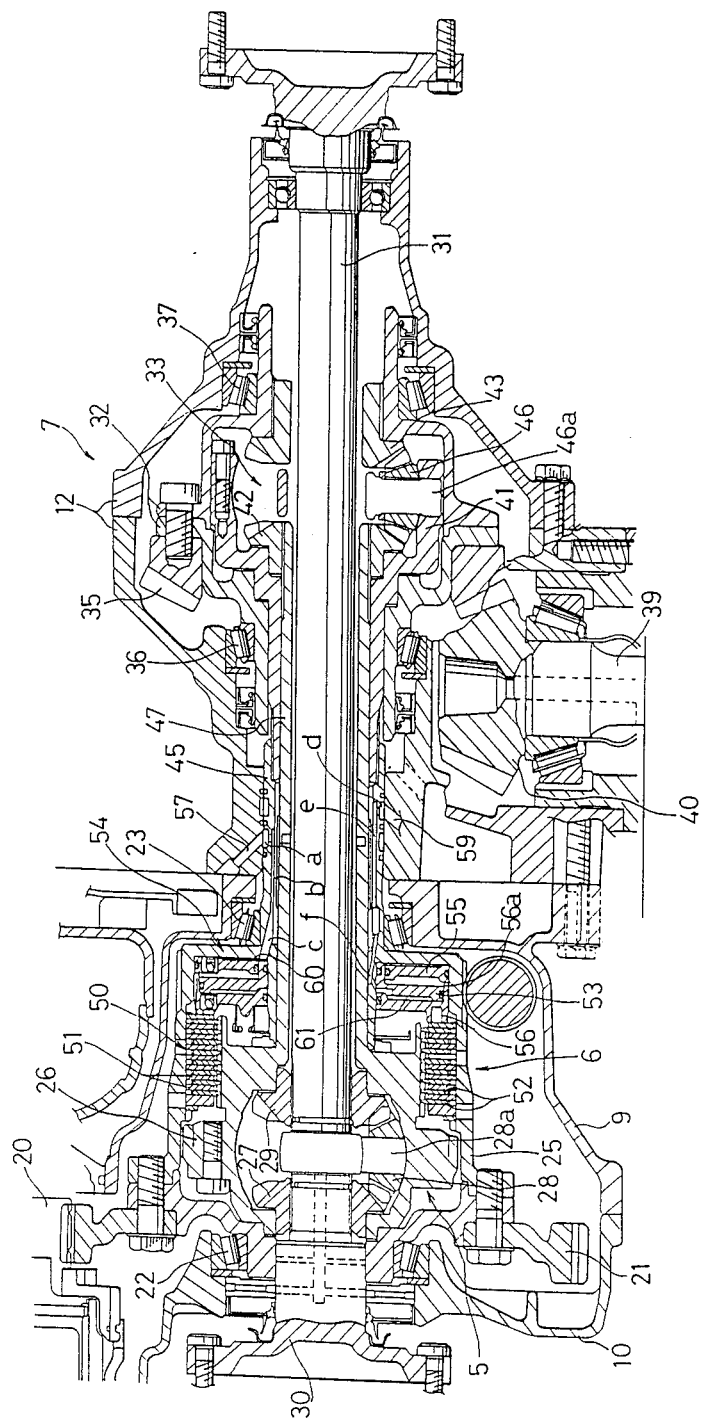
FIG. 3 is a cross-sectional view illustrating the front-wheel differential gear, the differential motion limiting device and the transfer section in the power transmission device shown in FIG. 2.

As shown in FIG. 3 in detail, the above-mentioned front wheel differential gear 5 is coaxially disposed in a mount casing 25 which secures the first ring gear 21 meshed with the gear 20 and which is supported by casings 10, 9 through tapered roller bearings 22, 23. Its front diff-carrier 26 is rotatably incorporated in the mount casing 25. To the diff-carrier 26 is rotatably supported a pinion shaft 28a extending radially do support a pinion 28 and left and right hand side gears 27, 29 are also rotatably supported within the diff-carrier 26, extending laterally. The side gears 27, 29 are coupled with front axles 30, 31 so that power can be transmitted thereto. The two piece transfer casing 12 is incorporated at the right side of the above-mentioned first ring gear mount casing 25 and the front wheel differential gear 5, in the rear of the engine, and the transfer unit 7 is constituted within the transfer casing 12 to be coupled coaxially with the first ring gear mount casing 25 and the front-wheel differential gear 5. The transfer unit 7 comprises a two piece second ring gear mount casing 32 supporting a rear-wheel drive second ring gear 35, and which is rotatably supported by the transfer casing 12 through a pair of tapered roller bearings 36, 37. The second ring gear 35 is always meshed with a gear 40 on the drive pinion shaft 39 that is drivingly coupled to the rear axles through a propeller shaft and a known rear wheel drive differential gear (not shown). The center differential gear 33 is disposed in the second ring gear mount casing 32, and has a diff-carrier 41 of cantilever structure which is held and supported between the inside of the second ring gear mount casing 32 and the outside of the left hand side gear 42. The rotation of the first ring gear mount casing 25 is transmitted to the diff-carrier 41 through a fist hollow shaft 45. A pinion shaft 46a is supported on the diff-carrier 41. The second ring gear mount casing 32 is spline-coupled directly to the right hand side gear 43, and the diff-pinion 46 fitted on the pinion shaft 46a is meshed with the left and right hand side gears 42, 43, the right front axle piercing through both side gears 42, 43 and projecting rightward from the right side end of the transfer casing 12. The left hand side gear 42 in the center differential gear 33 is drivingly coupled to the front diff-carrier 26 in the front-wheel differential gear 5 by means of a second hollow shaft 47 spline-coupled to the left side end of the side gear 42 and rotatably fitted over on the front axle 31.

Figure 1:
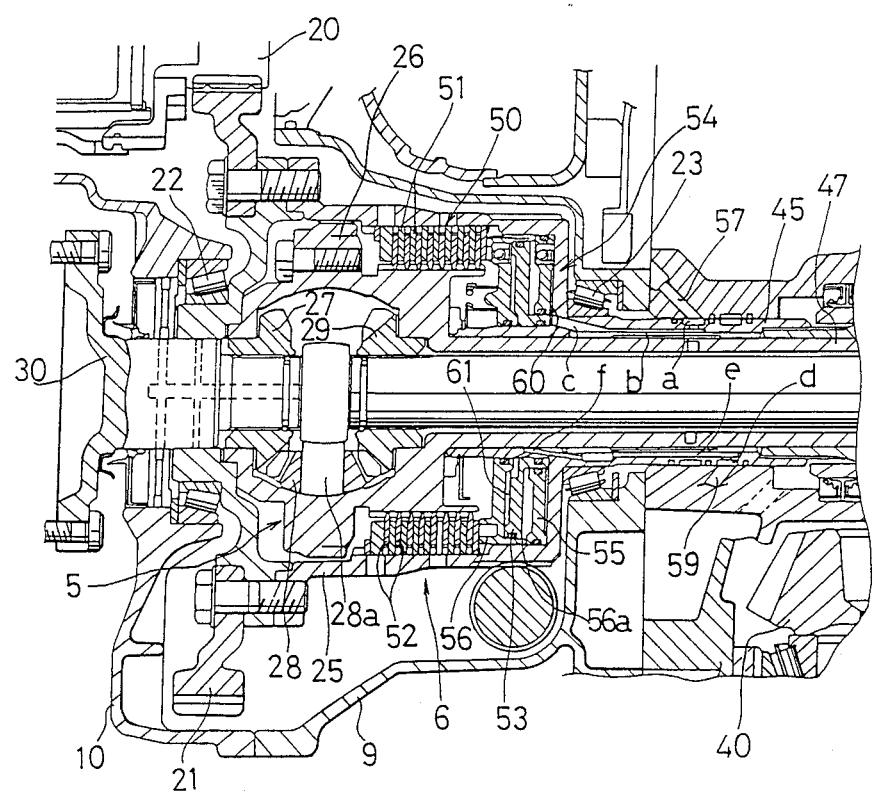
FIG. 1 is a cross-sectional view illustrating the wet multiple-disc type clutch in the power transmission device for a four-wheel drive vehicle according to the present invention.

The differential motion limiting mechanism 6, as shown in detail in FIG. 1, is disposed in the first ring gear mount casing 25 arranged coaxially with the front wheel differential gear 5 and covering the front-wheel differential gear 5, and comprises a wet multiple-friction disc clutch 50. The clutch 50 has outer friction discs 51 coupled to the mount casing 25 and inner friction discs 52 coupled to the diff-carrier 26, these friction discs 52 being adapted to be actuated by the first and second pistons 55,56 which are located in a cylinder formed in the mount casing 25. A reaction plate 53 is disposed in oil-tight manner between the first and second pistons 55, 56 within the cylinder, the pistons hence constituting a double-piston type hydraulic actuator 54 in which the first piston 55 abuts against the outer peripheral flange section 56a of the second piston 56 which abuts in turn against one side of the reaction plate 53. Oil passages 57, 59 are formed in the part of transfer casing 12 facing the transfer axle housing 9, at different angular positions, the first oil passage 57 communicating with an oil chamber 60 acting upon the first piston 55, through an annular groove a and oil grooves b, c which are formed in the first hollow shaft 45, while the second oil passage 59 communicates with an oil chamber 61 acting upon the second piston 56 through an annular groove d and oil grooves e, f.

Next, explanation will be made on the operation of the above-mentioned arrangement.

The rotation of the engine is transmitted to the automatic transmission 3 .through the torque converter 13 or the lock-up clutch 15, and subjected to a suitable speed reduction at the automatic transmission 3 and delivered to the output gear 20, and is thereafter transmitted to the first mount casing 25 through the first ring gear 21. During normal operation, no hydraulic pressure is applied to the hydraulic chambers 60, 61 and therefore, the wet multiple-disc type clutch remains in disengaged condition. In this condition, the rotation of the first mount casing 25 is transmitted to the diff-carrier 41 in the center differential gear 33 through the first hollow shaft 45, and is then distributed and transmitted from the diff-pinion 46 to the left and right side gears 42, 43. The rotation of the left side gear 42 is transmitted to the diff-carrier 26 of the front wheel differential gear 5 through the second hollow shaft 47 and is then distributed and transmitted from the diff-pinion 28 to the left and right hand side gears 27, 29 from which the rotation is transmitted to the left and right front axles 30, 31. Meanwhile, the rotation of the right hand side gear 43 is transmitted to the second mount casing 32 spline-coupled therewith, and then transmitted through the rear-wheel ring gear 35 and gear 40 to the drive pinion shaft 39 from which the rotation is transmitted to the left and right rear axles through the propeller shaft and the rear-wheel differential gear (not shown).

Where a tire may slip on a snowy or icy road surface, etc., or when any wheel drops in a ditch and slippage occurs, hydraulic pressure is fed into the oil chambers 60,61 to engage the wet multiple-disc clutch 50. In this condition the rotation of the first mount casing 25 is transmitted to the diff-carrier 26 in the front-wheel differential gear 5 through the clutch 50, and then is transmitted from the front-wheel differential gear 5 to the left and right axles 30, 31. Simultaneously, the diff-carrier 41 in the center differential gear 33 and the left hand side gear 42 integrally incorporated with the first mount casing 25 and the diff-carrier 26 through hollow shafts 45,47 are rotated in one piece with no differential motion, the same rotation being transmitted to the second mount casing 32. Thus, rotation with speed equal to that of the front-wheel drive diff-carrier 26 is transmitted to the rear-wheel drive ring gear 33 to drive the left and right rear axles.

At this stage, the operation of the first and second pistons 55, 56 may be selected in accordance with the condition of the road surface. For example, when it is preferable to allow for a certain degree of difference in rotational speeds between the front and rear wheels on a snowy road surface or the like, hydraulic pressure is fed into the oil chamber 60 alone through the oil grooves a, b, c. Then the first piston 55 presses the flange section 56a of the second piston 56 to engage the wet multiple-disc clutch 50 with a relatively small pressing force. In this condition, when a difference in torque between the front and rear wheels exceeds a predetermined value, the wet multiple-disc type clutch 50 slips to allow the torque to be born by the center differential gear 33 so that required torque can be transmitted to the front and rear wheels even when any one of the wheels slips, while preventing tire slippage caused by "tight cornering brake" and any rotational difference even during cornering. Further, in the event of any one of the front or rear wheels dropping in a ditch, in addition to the supply of hydraulic pressure into the oil chamber 60, hydraulic pressure is also fed into the oil chamber 61 through the oil passage 59 and the oil groove d, e, f. Then, a pressing force is exerted on the second piston 56 due to the force acting between the second piston 56 and reaction plate 53 in addition to the pressing force exerted by the first piston 55, the wet multiple-disc clutch 50 engaging with a relative large actuating force. In this condition the clutch is virtually prevented from slipping so that equal rotation speed is transmitted to both front and rear wheels, and therefore, a disabled transmission condition is prevented, enabling the wheel to escape from the ditch.

It is also possible to feed hydraulic pressure into both oil chambers 60,61 acting upon the first and second pistons 55, 56, respectively, from a common oil passage. In this case, although it is not possible to perform fine control as in the case where the pistons 55, 56 are individually actuated, a superimposed pressing force by the first and second pistons 55, 56 can be obtained, so that, a relatively large force can be obtained in a confined space. Further, since no mechanical power boosting device is used, it is possible to finely control the pressing force, and it is possible thereby to control the operation of the wet multiple-disc clutch 50 with a high degree of accuracy.

Next, explanation will be made concerning another embodiment in which the present invention is applied to a power transmission device for a part-time four-wheel drive vehicle.

Figure 4:
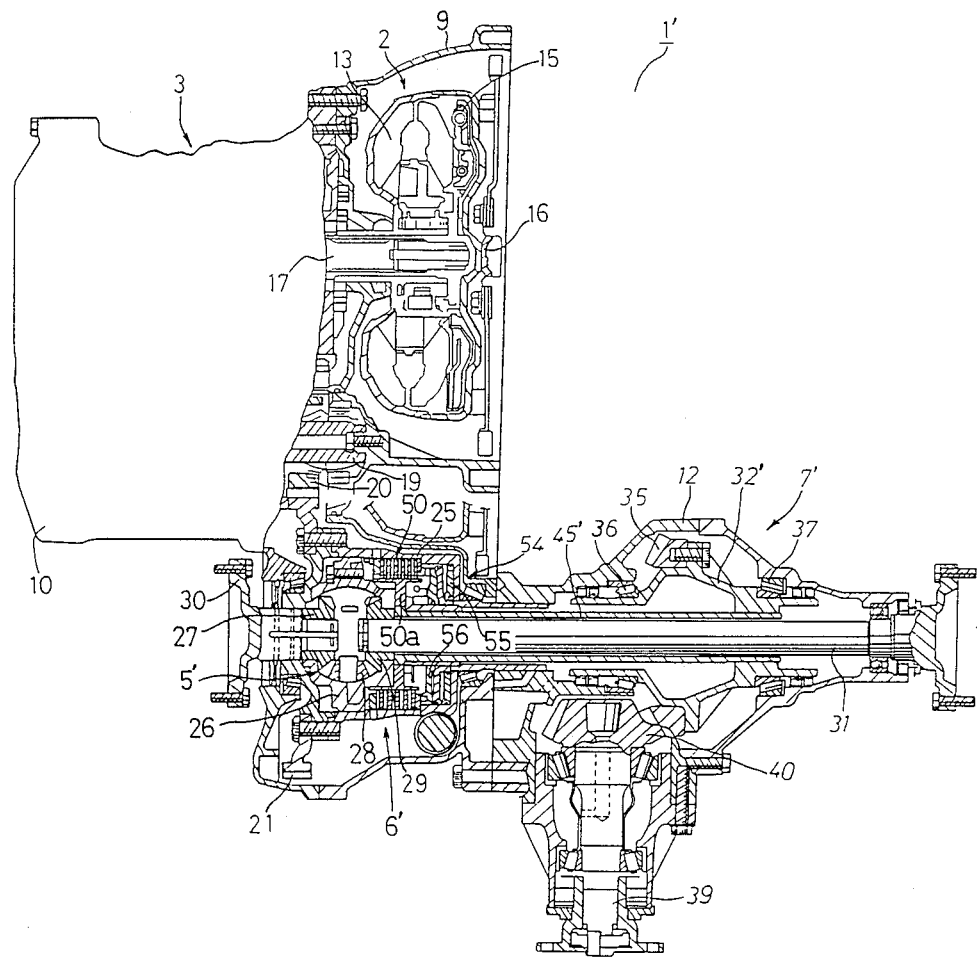
FIG. 4 is a cross-sectional view of a power transmission device for a part-time four wheel drive vehicle to which the present invention is applied.

The power transmission device 1' for a transverse front engine part-time four-wheel drive vehicle, comprises, as shown in FIG. 4, a torque converter unit 2, an automatic transmission 3, a front-wheel differential gear 5', a rearwheel drive switching unit 6' and a transfer section 7' which are contained in a transfer axle housing 9, a transfer axle casing 10 and a transfer casing 12 which are jointed with each other. The torque converter unit 2 and the automatic transmission 3 are identical to those in the full-time type power transmission device 1 mentioned before. The front-wheel differential gear 5' is mounted in a ring gear mount casing 25 securing the ring gear 21 meshed with the output gear 20 of the automatic transmission 3, and have a front diff-carrier 26 integrally fixed to the mount casing 25, the rotation of the ring gear 21 being transmitted through the differential gear 5' to cause differential rotation of the front axles 30, 31. The rear wheel drive switching unit 6' comprises a wet multiple-disc type clutch 50 fixed to the mount casing 25 together with the diff-carrier.28, carrier 26 and the clutch 50 is controlled by a hydraulic actuator 54 comprising double pistons 55, 56 similar to the clutch in the differential motion limiting device as mentioned before, and its output section 50a is coupled to a hollow shaft 45' fitted over the right front axle 31. The transfer unit 7' comprises a transfer casing 12 and a second ring gear mount casing 32' to which a hypoid ring gear 35 is fixed and which is spline-coupled with the end of the hollow shaft 45', the mount casing 32' being rotatably supported by the transfer casing 12 through roller bearings 36, 37. The gear 35 is meshed with a hypoid gear 40 fixed to the front end of a drive pinion shaft 39 extending rearward, the rotation of the hollow shaft 45' being transmitted to the drive pinion shaft 39 through the hypoid gears 35, 40.

With this arrangement, the rotation of the engine is transmitted to the automatic transmission 3 through the torque converter 13 or the lock-up clutch 15, and is then transmitted from the output gear 20 of the transmission 3 to the right and left front axles 30, 31 through the front-wheel differential gear 5' to drive the front wheels. The wet multiple-disc clutch 50 is changed over manually or automatically, only when four wheel drive is required for example, on a snowy road surface. When the clutch 50 is engaged, the rotation of the output gear 20 of the automatic speed transmission 3 is transmitted to the hollow shaft 45' through the clutch 50, and is further transmitted to the rear wheels through the second ring gear mount casing 32', the hypoid gears 35, 40 and the drive pinion shaft 39 to drive the rear wheels, thereby establishing four-wheel drive mode.

When the vehicle travels in the four wheel drive mode on a dirt road, a paved road or the like, hydraulic pressure is fed into the oil chamber 60 alone to actuate the first piston 55. In this condition the wet type multiple-clutch 50 is engaged with a relatively small force, and therefore, if a difference in torque between the front and rear wheels exceeds a predetermined value, slippage would occur in the clutch 50. Thus, the vehicle can travel in the four-wheel drive mode while preventing the "tight cornering brake" When the vehicle travels on a snowy road, a muddy road or the like, hydraulic pressure is also fed into the oil chamber 61 in addition to the supply of hydraulic pressure into the oil chamber 60. Then, the actuating force of the second piston 56 is effected in addition to the actuating force of the first piston 55, and therefore, the wet multiple-disc type clutch 50 is engaged with a relatively large pressing force. In this condition, slippage in the clutch 50 is virtually prevented so that equal rotational speed is transmitted to the front and rear wheels, and even if any one of the wheels slip, the vehicle can maintain sure traction through the other wheels.

In this embodiment concerning the part-time four-wheel drive, hydraulic oil may be fed into both first and second oil chambers 60, 61 through a common oil passage as in the above mentioned embodiment concerning the full-time version. In this case, the superimposed actuating force by the first and second pistons 55, 56 can be effected, and therefore a great torque transmitting capacity can be obtained in a limited space. The multiple disc clutch 50 can be controlled with a high degree of accuracy Next, the advantages obtained by the present invention will be explained. By using a friction (wet multiple-disc type) clutch 50, while providing smooth operation and improved controllability, the power transmission device can be made compact as the clutch 50 is located in the ring gear mount casing 25, 25' covering the front wheel differential gear 5,5 and coaxial with said differential gear. The power transmission device for a four-wheel drive vehicle can be obtained by slight modification of a power transmission device for an F. F vehicle, and with a slight modification involving the replacement of transfer unit 7, 7', with one another power transmission devices 1, 1' for both full-time and part-time four wheel drive may be obtained enabling the installation to cope with the wide variations in the types of vehicles without major change. As the friction (wet multiple-disc type) clutch is arranged to be pressed by the hydraulic actuator 54 comprising a plurality of pistons 55, 56 disposed in series, a large engaging force in proportion to the number of the pistons can be obtained, within a compact structure. Hence, it is possible to provide a sufficient torque transmitting capacity. Enabling the friction clutch 50 to be disposed on the downstream side of the final reduction gear 21 where a large torque transmitting capacity is required, so that a friction clutch 50 can be used in the power transmission device for a four-wheel drive vehicle based on F. F type. As hydraulic pressure is fed individually into the hydraulic chambers 60, 61 formed by the plurality of pistons 55, 56 through the respective oil passages the slippage control of the friction (wet multiple-disc type) clutch 50 can be made without using complex mechanisms such as a pressure regulating solenoid valve, or a duty control valve, to prevent the "tight cornering brake", and enabling more suitable four wheel drive control according to road conditions.

What is claimed is:

1. A differential limiting/switching device for a four wheel drive vehicle having an automatic transmission with an output gear, comprising:
    a first gear mounting casing having a first ring gear meshed with the output gear of the automatic transmission,
    a front wheel differential gear installed inside the first gear mounting casing and having a differential carrier,
    a transfer unit mounted coaxially with the front wheel differential gear for transferring rotational power to at least rear wheels, said transfer unit being connected to the first gear mounting casing and including a center differential gear, means for transferring rotational power from the center differential gear to the rear wheels, and means for transferring rotational power from the center differential gear to the front wheel differential gear,
    a friction clutch mounted coaxially with the front wheel differential gear for connection between the differential carrier and the transfer unit, said friction clutch being situated between the first gear mounting casing and the differential carrier, said friction along clutch constituting a differential motion limiting device for limiting at least differential motion of the center differential gear, and
    a hydraulic actuator having at least two pistons disposed in series in axial direction thereof and at least two oil chambers separately formed by the pistons, said hydraulic actuator being connected to the friction clutch so that when one of the two pistons is actuated, connection between the differential carrier and the transfer unit are frictionally and slidably made, and when the two pistons are actuated, connection between the differential carrier and the transfer unit are firmly made without slippage therebetween.

2. A differential limiting/switching device for a four wheel drive vehicle having an automatic transmission with an output gear, comprising:
    a first gear mounting casing having a first ring gear meshed with the output gear of the automatic transmission,
    a front wheel differential gear installed inside and connected to the first gear mounting casing and having a differential carrier,
    a transfer unit mounted coaxially with the front wheel differential gear for transferring rotational power to at least rear wheels,
    a friction clutch mounted coaxially with the front wheel differential gear and situated between the differential carrier and the transfer unit for connection therebetween, and
    a hydraulic actuator having at least two pistons disposed in series in axial direction thereof and at least two oil chambers separately formed by the pistons, said hydraulic actuator being connected to the friction clutch so that when one of the two pistons is actuated, connection between the differential carrier and the transfer unit are frictionally and slidably made, and when the two pistons are actuated, connection between the differential carrier and the transfer unit are firmly made without slippage therebetween.

3. A differential lifting/switching device for a four wheel drive vehicle having an automatic transmission with an output gear, comprising:
    a first gear mounting casing having a first ring gear meshed with the output gear of the automatic transmission,
    a front wheel differential gear installed inside the first gear mounting casing and having a differential carrier,
    a transfer unit mounted coaxially with the front wheel differential gear and having a center differential gear with a carrier coupled with the first gear mounting casing, said center differential gear having means for transferring rotational power from the center differential gear to rear wheels, and means for transferring rotational power from the center differential gear to the differential carrier,
    a friction clutch situated between the first gear mounting casing and the differential carrier and laid coaxially with the, front wheel differential gear for constituting a differential motion limiting device to limit differential motion of the center differential gear, and
    a hydraulic actuator having at least two pistons disposed in series in axial direction thereof and at least two oil chambers separately formed by the pistons and the first gear mounting casing, an amount of differential motion of said center differential gear being slippingly controlled by varying engaging force of said friction clutch based on hydraulic pressure applied to said chambers.

4. A device as set forth in claim 3, wherein hydraulic pressure is fed into the respective oil chambers through passages independent from one another.

5. A device as set forth in claim 3, wherein hydraulic pressure is fed into the respective oil chambers through a common oil passage.

6. A device as set forth in claim 3, wherein said friction clutch is a wet multiple-disc type clutch.

7. A differential limiting/switching device for a four wheel drive vehicle having an automatic transmission with an output gear, comprising:

a first gear mounting casing having a first ring gear meshed with the output gear of the automatic transmission, a differential gear installed inside the first gear mounting casing and having a differential carrier connected to the first gear mounting casing, a transfer unit mounted coaxially with the differential gear for transferring rotational power to rear wheels, a friction clutch mounted coaxially with the differential gear and situated in the first gear mounting casing for connection between the differential carrier and the transfer unit, and a hydraulic actuator having at least two pistons disposed in series in axial direction thereof and at least two coil chambers separately formed by the pistons and said first gear mounting casing, transmission power between said differential carrier and transfer unit being slippingly controlled by varying engaging force of said friction clutch based on hydraulic pressure applied to said chambers.

8. A device as set forth in claim 7, wherein said transfer unit includes means for transferring rotational power from the differential carrier to rear wheels, said friction clutch constituting a rear-wheel drive switching unit.

9. A device as set forth in claim 7, wherein hydraulic pressure is fed into the respective oil chambers through passages independent from one another.

10. A device as set forth in claim 7, wherein hydraulic pressure is fed into the respective oil chambers through a common oil passage.

11. A device as set forth in claim 7, wherein said friction clutch is a wet multiple-disc type clutch.

* * * * *